United States Patent [19]

Olsson et al.

[11] Patent Number: 4,576,875
[45] Date of Patent: Mar. 18, 1986

[54] WELDABLE WEAR PART WITH HIGH WEAR RESISTANCE

[75] Inventors: Olle G. Olsson; Melih Yaman, both of Sandviken; Mats G. Waldenström, Sundbyberg; Udo K. R. Fischer, Vallingby, all of Sweden

[73] Assignee: Santrade Ltd., Lucerne, Switzerland

[21] Appl. No.: 274,627

[22] Filed: Jun. 17, 1981

[30] Foreign Application Priority Data

Jun. 23, 1980 [SE] Sweden ............................ 8004608

[51] Int. Cl.⁴ .................. B32B 15/18; B22D 19/04; B22D 19/06; B02C 23/00
[52] U.S. Cl. .................. 428/627; 428/682; 164/108; 164/111; 241/291; 241/300
[58] Field of Search ............ 428/544, 681, 682, 684, 428/627; 76/108 R, DIG. 11; 241/291, 300, 195, 197; 51/309; 164/111, 108, 110, 112; 228/176, 263 D; 75/208 R

[56] References Cited

U.S. PATENT DOCUMENTS

| 1,787,526 | 1/1931 | Honstain | 164/111 |
|---|---|---|---|
| 2,070,156 | 2/1937 | De Bats | 428/684 |
| 2,743,495 | 5/1956 | Eklund | 164/110 |
| 3,612,421 | 10/1971 | Sabel | 241/291 |
| 4,119,459 | 10/1978 | Ekemar | 75/243 |

FOREIGN PATENT DOCUMENTS

| 672089 | 2/1939 | Fed. Rep. of Germany | 241/300 |
|---|---|---|---|
| 714013 | 10/1941 | Fed. Rep. of Germany | . |
| 718489 | 2/1942 | Fed. Rep. of Germany | . |
| 2616184 | 3/1978 | Fed. Rep. of Germany | 228/263 D |
| 2846574 | 5/1980 | Fed. Rep. of Germany | 241/195 |
| 55725 | 5/1976 | Japan | 164/108 |
| 28532 | 3/1978 | Japan | 228/263 D |
| 100946 | 8/1979 | Japan | 228/263 D |
| 646850 | 11/1950 | United Kingdom | . |
| 655914 | 8/1951 | United Kingdom | 164/111 |
| 928928 | 6/1963 | United Kingdom | . |
| 1140838 | 1/1969 | United Kingdom | . |
| 1181972 | 2/1970 | United Kingdom | . |
| 2044646 | 10/1980 | United Kingdom | . |

Primary Examiner—L. Dewayne Rutledge
Assistant Examiner—John J. Zimmarman
Attorney, Agent, or Firm—Burns, Doane, Swecker & Mathis

[57] ABSTRACT

A wear part with high wear and abrasion resistance combined with unlimited weldability and good mechanical strength or toughness, comprising a composite part of hard metal portion, a cast metal alloy body portion and attached thereto to joining portion, characterized in that the joining portion consists essentially of a weldable steel which by casting is bonded to the cast metal alloy body portion to a combined mechanical-metallurgical bond is provided, as well as a method for forming such a wear part.

10 Claims, 3 Drawing Figures

WELDABLE WEAR PART WITH HIGH WEAR RESISTANCE

BACKGROUND OF THE INVENTION

The present invention relates to encasing or embedding of hard metal (that is, cemented carbides) and weldable steel in cast alloys, preferably cast iron, and to products manufactured in this way. Such products may include wear elements used in machine parts, tools, etc., that are subjected to considerable wear. Construction elements used under wear conditions and cutting bodies for cutting or working of material, e.g., cutting tips in rock drilling, are other applications.

All these products are characterized in that the parts exposed to wear or other kinds of destruction are made of cemented carbide or other hard particles in the form of lumps, crushed pieces, powder, pressed and/or sintered bodies or parts of arbitrary form embedded in a base of cast iron.

As wear elements often are parts of machines or constructions of considerable size, e.g., mining machines and the like, these elements often have to be mounted on a steel base part directly in the work place. Sometimes mechanical joints between the wear element and the steel base part can be used but such joints have a substantial risk of loosening and thus breaking down. Welding of the wear element to the steel base part is therefore preferred.

It is previously known to cast a portion of a wear part onto a preformed portion of the same composition whether steel on steel or light metal alloy onto light metal alloy. See German Pat. No. 714 013. While such construction may achieve a metallurgical bond between the portions, use of wear parts in machine construction, particularly of considerable size, results in stresses which can exceed the strength of such a metallurgical bond. In addition, such a construction requires the use of relatively expensive cast alloys for the body when such alloys are used for wear portion (as is generally the case).

It is previously known that encasing or embedding of hard metal in graphitic cast iron, a relatively inexpensive metal alloy, results in products with very high wear resistance and abrasion resistance combined with excellent strength and toughness. However, wear parts of such a composite material have poor weldability. The strength of a welded joint between graphitic cast iron and steel is relatively low and in operation the construction is sensitive to microcracks. Furthermore, direct welding of a graphitic cast iron and a constructional element of steel is very time consuming and expensive because the welding procedure requires, among other steps, preheating, well adjusted cooling, expensive special electrodes and subsequent heat treatment to obtain a satisfactory strength of the welded joint. In practice, when the welding operations have to be carried out on huge construction machines in a work place, several of these demands cannot be fulfilled.

OBJECTS AND SUMMARY OF THE PRESENT INVENTION

It is an object of the present invention to avoid or alleviate the problems of the prior art.

It is an object of the present invention to provide a hard metal-containing wear element which has a relatively inexpensive, graphitic cast iron body portion and which is nonetheless easily weldable to a steel base.

A further object of the invention is to provide a method for forming a hard metal-containing, graphitic cast iron-containing, easily weldable wear element.

In accordance with one aspect of the present invention, there is provided a wear part with high wear and abrasion resistant combined with unlimited weldability and good mechanical strength or toughness, comprising a composite part of a hard metal portion, a cast metal alloy body portion and a joining portion, characterized in that the joining portion consists essentially of a weldable steel which by casting is bonded to the cast metal alloy body portion by a combined mechanical-metallurgical bond.

There is also provided a method for forming a wear part with high wear and abrasion resistance combined with unlimited weldability and good mechanical strength or toughness which comprises providing in a mold a hard metal portion and spaced therefrom a weldable steel portion, said weldable steel portion including means to be embedded in a resulting cast metal alloy portion for enhancing the mechanical bond between the weldable steel portion and the cast metal alloy portion and casting a metal alloy in said mold to encase the said hard metal portion and the weldable steel portion into a unitary wear part.

DETAILED DESCRIPTION OF THE INVENTION

According to the present invention, it has been found that wear parts, which have to be welded and which are made of hard metal and graphitic cast iron, can be manufactured in the following way. That portion of the wear element which is usually made of graphitic cast iron and which later is to be welded to the construction or machine element is replaced by a suitably shaped, unlimitedly weldable steel part which is placed in the mold along with the hard metal portion before casting. The graphitic cast iron is then cast into the mold to encase and/or embed the separate hard metal portion and weldable steel portion into the cast iron and thus form a unitary wear element body.

The steel portion is shaped in such a way as to provide a combined mechanical-metallurgical joint between the steel part and the cast alloy after casting. To fulfill the requirement of a satisfactory mechanical joint concerning strength, that part of the steel piece which is cast in the cast iron is equipped with a sufficiently strong locking portion. The metallurgical joining is achieved due to the formation of a transition zone between the steel portion and the cast alloy.

The cast alloy which forms the body of such an article of the present invention consists essentially of a principally graphitic cast iron with a low wear resistance and weldability and a carbon equivalent, $C_{equ}$, (i.e., the content of carbon along with the contents of other constituents and alloying elements equivalent to carbon in regard to their influence on the properties of the cast iron as defined by the equation $C_e$-

$qu = \%C + 0.3(\%Si + \%P))$ is at least 3.5 and at the most 6.0.

An intermediate alloying phase or transition zone is usually formed between the hard metal and the cast alloy when the cast alloy is poured about the hard metal. Usually 20–80%, preferably 30–70%, of the original amount of hard metal is part of the transition zone. The hard metal may be any of the conventional metal carbides (e.g., WC, TiC and/or other metal carbides alone or in admixture with each other) cemented with an iron group metal (e.g., Co). The hard metal may be placed in the mold in the form of loose pieces or particles or as a preformed (e.g., pressed and/or sintered) body. Generally, the hard metal will be initially in the form of particles and at least 90% of the hard metal should have an initial particle size from 1 to 8 mm.

The weldable steel encased in the cast alloy consists essentially of unalloyed or low alloyed steel with a carbon concentration preferably $\leq 0.2\%C$ and with a composition adjusted so that $\%C + \%Mn/6 + (\%Cr + \%Mo + \%V)/5 + (\% Ni + \%Cu)/15 \leq 0.41$.

Figure 1:
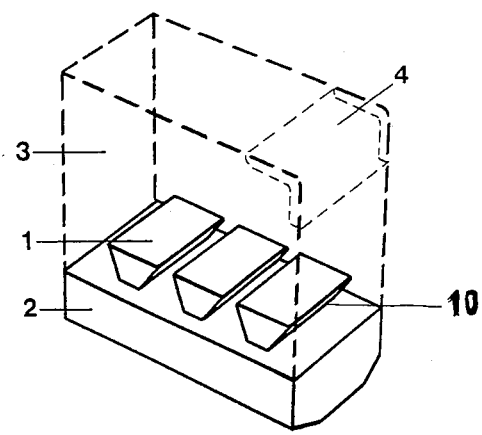
FIG. 1 is a representation of one embodiment of the wear part of the present invention.
Figure 2:
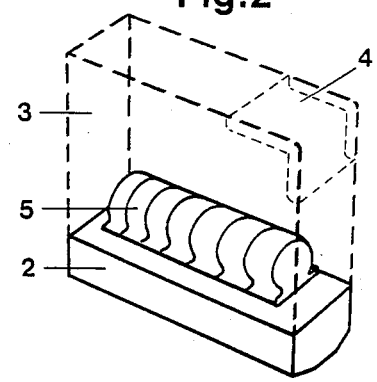
FIG. 2 is a representation of another embodiment of the wear part of the present invention.
Figure 3:
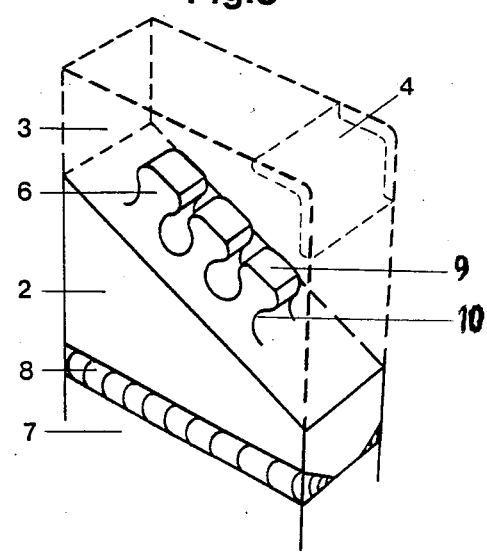
FIG. 3 is a representation of another embodiment of the wear part of the present invention.

FIG. 1 shows the principle of the present invention in which a weldable steel portion 2 equipped with a locking means 1, the steel part 2 being encased and/or embedded in a cast alloy 3 in which also the hard metal crushed pieces 4 are also embedded. In FIG. 2 another suitable construction 5 of the locking means is shown. In FIG. 3 there is shown a third embodiment 6 of the locking means as well as showing the weldable steel part 2 being bonded to a steel construction element 7 by a welded joint 8. The other parts of FIGS. 2 and 3 correspond to the description of FIG. 1.

As shown in the Figures, the locking device can take various forms so long as it enhances the mechanical locking between the weldable steel portion and the cast metal alloy portion. To facilitate the locking function, the locking means 1 generally contains protrusions 9 from the surface of weldable steel portion including an undercut portion 10 although other mechanical equivalents should be satisfactory.

It is previously known to embed steel in cast iron, for example, in connection with the reinforcement of castings with thin plates or bars of steel. A common problem in such instances is the inner tensions which are present after the cooling due to the different coefficients of heat expansion of the reinforcing and cast materials. Different types of separating substances have been used to give the reinforcing material the possibility of free expansion or shrinkage relative to the cast material and to compensate for the tensions. By a combined mechanical-metallurgical joint between cast iron and steel according to the present invention such tensions are compensated without using a separating material. The strength of the joint described is very good. The sensitivity to propagation of microcracks as a subsequence of vibrations in working operations is furthermore considerably less then that of a welded joint.

According to the invention there is now provided a composite body consisting of hard metal cast alloy and weldable steel with properties which have previously not been possible to achieve. The combination of excellent wear resistance and good weldability must be considered completely unique.

As an example, results of tests in practice with the article of the present invention used in sinter crush arms, will be described. Because of the size of the machine, the sinter crush arms must be welded onto a steel shaft directly in the work place. Sinter crush arms made according to the invention in which hard metal crushed pieces and a weldable part of steel are placed in a mold and cast at 1530° C. in the same graphitic cast iron, are compared both with sinter crush arms of hard metal and graphitic cast iron which are welded—observing all the necessary heat treatments and using expensive special electrodes—onto a separate weldable steel part and then welded onto the steel shaft, and with arms of hard metal and graphitic cast iron which are welded directly in the work place onto the steel shaft. The hard metal pieces are pieces (over 90% having a particle size between 1 and 8 mm) of type WC-Co. The weldable steel portion has the mechanical locking device as shown in FIG. 3 and has a composition of 0.18 %C, 1.0 %Mn, 0.15 %Cr, <0.01 %Mo, <0.01 %V, <0.01 %Ni, 0.2 %Cu. The graphitic cast iron has the following composition: 4.0 %C, 1.2 %Si, 0.6 %Mn, 0.024 %P, 0.006 %S, 0.04 %Cr, 0.07 %Ni, 0.05 %Al, 0.024 %Mg, 0.02 %Cu, $C_{equ} = 4.4$.

Those arms which are welded together with a weldable steel part beforehand achieve a satisfactory strength and the construction lasts for about 3–4 weeks. Those arms, consisting of hard metal and graphitic cast iron, which are welded directly in the work place come off the steel shaft after about only 19 hours testing time, in spite of the fact that recommended special electrodes are used for the welding. Sinter crush arms produced according to the present invention have been tested for about 18 weeks without breakdown. Thus, the comparative tests confirm the extremely superior properties of strength and wear resistance of the composite product consisting of hard metal crushed pieces graphitic cast iron and a steel part cast in the cast iron.

As another example, wear hunches for sinter crusher bars are tested. Usually such wear hunches are made by applying hard metal onto the steel bars by hardfacing. Wear hunches are produced according to the present invention using hard metal pieces of type WC-Co (particle size 2–6 mm). The weldable steel portion has a composition of 0.18 %C, 1.1 %Mn, 0.1 %Cr, 0.15 %Cu, <0.01 %Mo, <0.01 %V, <0.01 %Ni and a mechanical locking device as shown in FIG. 3. The graphitic cast iron has the composition described in the previous example. The casting temperature is 1550° C. The life of the wear hunches made according to the present invention is about 47 weeks whereas that of the conventional hunches is about 10 weeks.

Among further applications for which the combination of very high wear resistance and unlimited weldability is essential, the following ones can be mentioned: flails in various types of mills, digging teeth, plow shares, antiwear elements to be welded in places exposed to wear, teeth of dredgers, frame ledges, etc. Other embodiments of the present invention can be wear parts consisting of hard metal cast in a cast alloy and being provided with other steel joining parts, such as bolts, etc., cast in the cast alloy.

All percentages, parts or units used herein are by weight unless otherwise indicated.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. Wear part with high wear and abrasion resistance combined with good weldability and good mechanical strength or toughness, comprising a composite part of hard metal portion, a cast iron body portion and a joining portion, characterized in that the joining portion consists essentially of a weldable steel which by casting is bonded to the cast iron body portion by a combined mechanical-metallurgical bond.

2. Wear part according to claim 1, wherein the cast iron consists essentially of graphitic cast iron having a carbon equivalent of from 3.5 to 6.0.

3. Wear part according to claim 1, wherein the weldable steel is an unalloyed or low alloyed steel with a carbon content $<0.2\%$ C.

4. Wear part according to claim 3, wherein the composition of the weldable steel is adjusted so that $\%C+\%Mn/6+(\%Cr+\%Mo+\%V)/5+(\%Ni+\%Cu)/15<0.41$.

5. Wear part according to claim 1, wherein the weldable steel is bonded by protrusions from the surface of weldable steel portion which form undercuts with the cast iron body portion.

6. A method for forming a wear part with high wear and abrasion resistance combined with good weldability and good mechanical strength or toughness which comprises providing in a mold a hard metal portion and spaced therefrom a weldable steel portion, said weldable steel portion including means to be embedded in a resulting cast iron portion for enhancing the mechanical bond between the weldable steel portion and the cast iron portion and casting a metal alloy in said mold to encase the said hard metal portion and the weldable steel portion into a unitary wear part.

7. A method for forming a wear part according to claim 6, wherein the cast iron consists essentially of graphitic cast iron having a carbon equivalent of from 3.5 to 6.0.

8. A method for forming a wear part according to claim 6, wherein the weldable steel is an unalloyed or low alloyed steel with a carbon content $<0.2\%C$.

9. A method for forming a wear part according to claim 8, wherein the composition of the weldable steel is adjusted so that $\%C+\%Mn/6+(\%Cr+\%Mo+\%V)/5+(\%Ni+\%Cu)/15<0.41$.

10. A method for forming a wear part according to claim 6, wherein the weldable steel is bonded by protrusions from the surface of weldable steel portion which form undercuts with the cast iron body portion.

* * * * *